United States Patent
Pompier

(10) Patent No.: US 6,807,993 B2
(45) Date of Patent: Oct. 26, 2004

(54) WHEEL RIM AND ASSEMBLY OF SUCH A RIM WITH A BEARING SUPPORT

(75) Inventor: Jean-Pierre Pompier, Volvic (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/212,624

(22) Filed: Aug. 5, 2002

(65) Prior Publication Data

US 2003/0029539 A1 Feb. 13, 2003

Related U.S. Application Data

(63) Continuation of application No. PCT/EP01/01186, filed on Feb. 5, 2001.

(30) Foreign Application Priority Data

Feb. 21, 2000 (FR) .............................. 00 02146

(51) Int. Cl.$^7$ .............................................. B60B 21/02
(52) U.S. Cl. ..................... 152/379.3; 152/380; 152/520
(58) Field of Search .......................... 152/379.3, 379.4, 152/379.5, 380, 381.3, 381.4, 516, 520

(56) References Cited

U.S. PATENT DOCUMENTS

| | | | |
|---|---|---|---|
| 3,990,491 A | * | 11/1976 | Hampshire et al. .......... 152/158 |
| 4,572,265 A | * | 2/1986 | Lescoffit ................... 152/379.3 |
| 5,634,993 A | | 6/1997 | Drieux et al. ............... 152/158 |
| 5,749,982 A | | 5/1998 | Muhlhoff et al. ............ 152/158 |
| 5,785,781 A | | 7/1998 | Drieux et al. ................ 152/454 |
| 5,787,950 A | | 8/1998 | Muhlhoff et al. ......... 152/379.5 |
| 6,035,913 A | * | 3/2000 | Bapt et al. ................ 152/381.4 |
| 6,092,575 A | | 7/2000 | Drieux et al. ............... 152/158 |
| 6,415,839 B1 | * | 7/2002 | Pompier et al. .......... 152/381.4 |
| 6,418,992 B1 | | 7/2002 | Drieux et al. ............... 152/454 |
| 6,470,936 B2 | * | 10/2002 | Pauc et al. ................ 152/379.5 |

FOREIGN PATENT DOCUMENTS

| | | |
|---|---|---|
| FR | 2699121 | 6/1994 |
| FR | 2713557 | 6/1995 |
| FR | 2713558 | 6/1995 |
| WO | WO0108905 | 2/2001 |

* cited by examiner

Primary Examiner—Russell D. Stormer
(74) Attorney, Agent, or Firm—Burns, Doane, Swecker & Mathis, L.L.P.

(57) ABSTRACT

Wheel rim comprising two rim seats having different diameters, inclined outwards and extended axially outwards by two humps of small height, the rim seat of smaller diameter being connected axially on the inside to a bearing surface via a truncated conical portion and the rim seat of larger diameter being connected axially on the inside to the said bearing surface by a rib of small or zero height, whose axially interior wall has a generatrix that makes with the rotation axis an angle open radially and axially outwards and at the most equal to 30°, characterised in that the said rib, which has an axially inside wall of axial width at most equal to the axial width of the said second seat is provided circumferentially with at least two transverse grooves of small size.

14 Claims, 2 Drawing Sheets

WHEEL RIM AND ASSEMBLY OF SUCH A RIM WITH A BEARING SUPPORT

CROSS REFERENCE TO RELATED APPLICATION

This application is a continuation application under 35 U.S.C. §120 of international application Serial No. PCT/EP01/01186, filed Feb. 5, 2001 and published as WO 01/62544 On Aug. 30, 2001 in French, which further claims priority under 35 U.S.C. §119 to French application Serial No. 00/02146 filed Feb. 21, 2000.

BACKGROUND OF INVENTIONS

The present invention concerns a one-piece mounting rim for a tire with a radial carcass, which together with a tire tread support ring and the said tire, forms a rolling assembly that is particularly useful in the case of rolling at an inflation pressure abnormally low compared with the recommended pressure, such that the said service pressure may even become zero. The invention also concerns the said assembly.

With a view to overcoming the above difficulties, patent EP 0 673 324 describes a rolling assembly consisting of a tire and comprising a one-piece wheel rim with two rim seats said to be inclined outwards and extended axially towards the outside by two protrusions or humps of small height. The seat of the rim edge that is to be on the outside of the vehicle is extended axially inwards by a bearing surface designed and adapted to receive a tread support, while the seat towards the inside of the vehicle is extended axially inwards by a rim flange connected to the bearing surface via a mounting groove. The preferred variant of the said rim has two seats inclined outwards and of unequal diameter, the seat generally located on the outside of the vehicle having a diameter smaller than the diameter of the seat located towards the inside of the vehicle.

The diameter difference between the two seats may make it unnecessary to have the mounting groove near the second rim seat with the larger diameter, the axially internal end of the said second rim seat being connected to the bearing surface of the tread bearing support by a rib of small or zero height. The assembly's bearing support, which is a support made of an elastomer material that can undergo deformation to an oval shape and can be fitted onto the bearing surface, can have an axial width equal to the axial distance between the two tire beads. The said tread bearing support, as its name implies, serves to prevent the collapse of the tread and so allows the tire to roll with an acceptable degree of deflection despite the deficit or absence of inflation gas, while keeping the outer tire bead firmly in position on its rim seat.

A rolling assembly as described above comprises a tire tread bearing support and indeed must comprise such a support, on pain of not having available a safety element which is essential during rolling in what is called the degraded condition, i.e. when the tire's inflation pressure becomes low or zero.

SUMMARY OF THE INVENTION

To avoid the accidental mounting and use of such a rolling assembly without a tread bearing support, the invention proposes a rim corn rising two rim seats with different diameters inclined towards the outside and extended axially outwards by two humps of small height, the rim seat of smaller diameter being joined axially inwards to a bearing surface via a truncated conical portion and the rim seat of larger diameter being joined axially on the inside to the said bearing surface by a rib of small or zero height, whose axially interior wall has a generatrix which makes, relative to the rotation axis, an angle open radially and axially towards the outside equal to at most 30°, characterized in that the said rib, which has an axially interior wall of axial width at most equal to the axial width of the said second seat, is provided circumferentially with at least two transverse grooves of small size.

A seat "inclined outwards" is understood to be a seat whose axially inside edge is a circle of larger diameter than the circle of the axially outer edge. Similarly, the diameter of a rim seat is the diameter of its edge having the largest diameter. A hump "of small height", bearing in mind the dimensions of the rims concerned and the sizes of the tires to be fitted on the said rims, is understood to mean a hump whose height is at most 2.5% of the minimum diameter of the rim's bearing surface. Likewise, a rib of small height is one whose height is at most equal to 2.5% of the minimum diameter of the rim's bearing surface.

Due to the combined presence of the slope and the grooves formed in the truncated conical portion disposed between the bearing surface of the tread bearing support and the axially internal end of the rim seat, the above wheel rim does not allow the primary airtightness required for the tire to be inflated, unless the tread bearing support is installed.

Since it is always desirable for the rolling assembly so formed to be as light as possible, it is particularly advantageous to provide the mounting rim at the same time with a circumferential groove located on the side of the seat having the smaller diameter, which divides the bearing surface of the bearing support into two distinct zones. The tread bearing support can have an axial width equal to the distance between the inside walls of the two tire beads, and is then arranged over the full width of the rim's bearing surface. The said support can also have a smaller width, and is then arranged only over the zone of the bearing surface closest to the rim seat of larger diameter, as described in the application WO 01/08905. In the latter case the said support has a base provided on its radially inside surface with a protuberance which, during the mounting operation, lodges in a circumferential groove provided for the purpose in the rim's bearing surface, the said groove being closer to the end of the support zone on the side of the seat having the smaller diameter than to the end of the said zone closer to the rim seat having the larger diameter. Whatever its axial width, the tread bearing support pushes the bead with larger diameter axially outwards during mounting, so that the said bead will automatically locate itself on its rim seat.

Better control of the mounting of the tire-support assembly is obtained thanks to the presence, axially between the internal end of the inside wall of the rib near the rim seat of larger diameter and the end of the rim's bearing surface, of a circumferential groove of small size. When the tire bead of larger diameter is moving onto the rim, it can catch slightly in the said groove. The resistance offered to the push serves as a sign indicating that the said bead is in place, and the second resistance noted is the last because it is due to the axially external hump of the rim.

BRIEF DESCRIPTION OF THE DRAWINGS

The invention will be better understood with the help of the drawings attached to the description illustrating non-limiting example embodiments of an assembly comprising a wheel rim and a bearing support for the fitting of a tire. In the drawing.

DETAILED DESCRIPTION OF PREFERRED EMBODIMENTS

Figure 1:
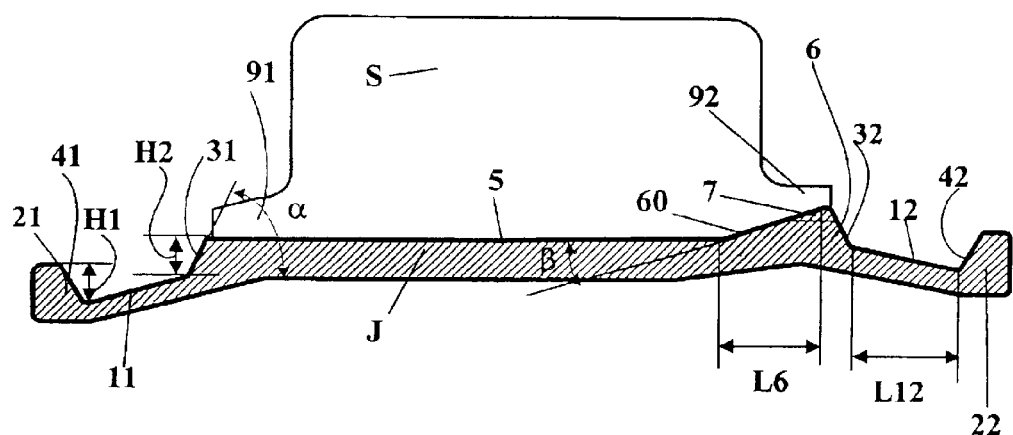
FIG. 1 is a schematic representation, seen in meridian section, of a first rim/bearing support assembly according to the invention.
Figure 2:
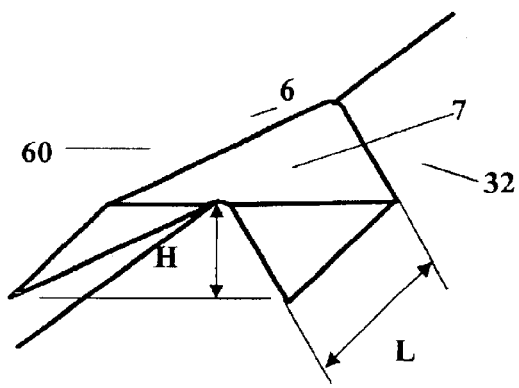
FIG. 2 shows an enlarged representation of a transverse groove of small size.

The wheel rim J shown in FIG. 1 comprises two rim seats 11 and 12, each seat being inclined outwards, i.e. each having an axially outer end whose circle has a smaller diameter than that of the circle forming the axially inner end. The two seats are respectively connected axially on the outside to two humps 21 and 22 whose axially inside walls 41 and 42 are of small height $H_1$, i.e. a height equal to at most 2.5% of the minimum diameter of the rim's bearing surface 5. The two seats 11 and 12 extend axially inwards in two truncated conical portions 31 and 32 of height $h_2$ at least equal to 0.01 times the diameter of the bearing surface 5, the said portions 31 and 32 having generatrices that make relative to the rotation axis an angle α open axially inwards and radially outwards, equal to at least 45°. On the side of the first rim seat 11, preferably on the outer side of the vehicle, the portion 31 is directly connected to the rim's bearing surface 5, while on the other side of the rim J or the side of the second rim seat 12 the truncated conical portion 32, which is the axially outer wall of the rib 6, is connected to the bearing surface 5 via a truncated conical wall 60, of axial width $L_6$ smaller than the width $L_{12}$ of the rim seat 12, whose generatrix makes relative to the rotation axis an angle β open axially and radially outwards, which is smaller than 30°. The support S is a usual rubber support whose axial width is equal to the distance between the two axially inside ends of the portions 31 and 32. As known in its own right, the said support has a base wider than its main body, and the two reinforcements 91 and 92 hold the two tire beads (not shown) on their respective seats. The rib 6 is provided with four circumferentially equidistant transverse grooves or recesses 7, one of these recesses being shown in FIG. 2. The width of a recess is equal to 4 mm and in any case smaller than 10 mm, while its depth h is equal to 2 mm and smaller than 3 mm, these dimensions justifying the statement that the recess is of small size.

Figure 3:
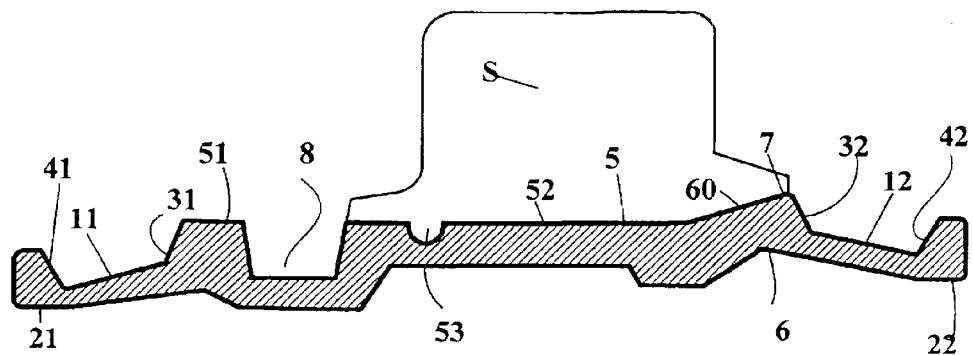
FIG. 3 is a schematic representation of a second variant of an assembly according to the invention.

The assembly variant shown in FIG. 3 consists of a rim J having a bearing surface 5 divided into two support zones 51 and 52 axially separated by a circumferential groove 8. The support zone 52 nearest the second rim seat 12 is provided on its base with a circumferential groove 53 into which fits the protuberance 9 of the bearing support S.

Figure 4:
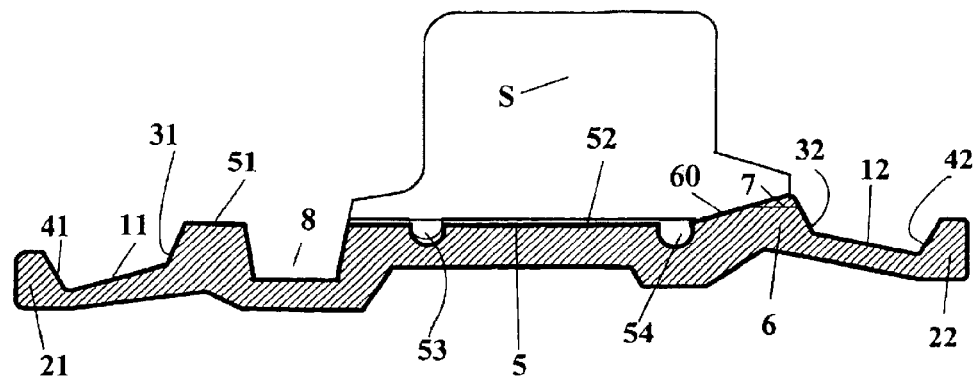
FIG. 4 shows a third variant of an assembly according to the invention.

As for the variant shown in FIG. 4, this differs from that of FIG. 3 by the presence of a circumferential groove 54 that joins the axially outer end of the second support zone 52 and the truncated conical portion 60, which in the case described is directly extended axially outwards by the second rim seat 12 inclined outwards. This second circumferential groove 54, positioned just before the wall 60, offers a slight impediment to the axial movement of the second tire bead during the mounting operation associated with the possible rotation of the tire bead.

I claim:

1. A wheel comprising:
   two rim seats having different diameters, inclined outwards and extended axially outwards by two humps of small height, said rim teats having an axial inner end and an axial outer end,
   wherein the axial inner end of the rim seat of smaller diameter is connected to a bearing surface by a truncated conical portion and
   wherein the axial inner end of the rim seat of larger diameter is connected to the said bearing surface by a rib of small height, whose axially interior wall has a generatrix forming with the rotation axis an angle β at most equal to 30° open radially and axially outwards,
   wherein said rib, which has an axially inside wall of axial width $L_6$ at most equal to the axial width $L_{12}$ of the said second seat, is provided circumferentially with at least two transverse grooves, each groove having a circumferential width smaller than 10 mm.

2. The rim according to claim 1, wherein the bearing surface of the mounting rim is divided into two support zones and axially separated by a circumferential groove located on the side of the seat having the smaller diameter.

3. The rim according to claim 2, wherein the support zone is provided with another circumferential groove, closer to the end of the support zone located on the side of the seat having a smaller diameter than the end of the said zone closer to the rim seat.

4. The rim according to claim 1, wherein the outer face of the rim is provided with a circumferential groove of small size arranged axially between the axially interior wall of the rib close to the rim seat of larger diameter, and the rims' bearing surface, the axially outer wall of the rib being connected directly to the rim seat of larger diameter.

5. The rim according to claim 2, wherein the outer face of the rim is provided with a circumferential groove of small size arranged axially between the axially interior wall of the rib close to the rim seat of larger diameter, and the rim's bearing surface, the axially outer wall of the rib being connected directly to the rim seat of larger diameter.

6. The rim according to claim 3, wherein the outer face of the rim is provided with a circumferential groove of small size arranged axially between the axially interior wall of the rib close to the rim seat of larger diameter, and the rim's bearing surface, the axially outer wall of the rib being connected directly to the rim seat of larger diameter.

7. An assembly formed of a rim, a tire having two beads with two inside walls and a tread bearing support, said rim comprising:
   two rim seats having different diameters, inclined outwards and extended axially outwards by two humps of small height, said rim seats each having an axial inner end and an axial outer end,
   wherein the axial inner end of the rim seat of smaller diameter is connected to a bearing surface by a truncated conical portion and,
   wherein the axial inner end of the rim seat of larger diameter is connected to the said bearing surface by a rib of small height, whose axially interior wall has a generatrix forming with the rotation axis an angle β at most equal to 30° open radially and axially outwards, the tire bearing support engaging at interior wall,
   wherein said rib, which has an axially inside wall of axial width $L_6$ at most equal to the axial width $L_{12}$ of the said second seat, is provided circumferentially with at least two transverse grooves of small size, and wherein the axial width of the bearing support is equal to the distance between the two inside walls of the beads of the tire fitted on its rim.

8. An assembly according to claim 7 wherein the bearing surface of the mounting rim is divided into two support zones and axially separated by a circumferential groove located on the side of the seat having the smaller diameter.

9. An assembly according to claim 7 wherein the support zone is provided with another circumferential groove, closer to the end of the support zone located on the side of the seat having a smaller diameter than the end of the said zone closer to the rim seat with larger diameter.

10. An assembly formed of a rim and a tread being support, said rim comprising:
   two rim seats having different diameters, inclined outwards and extended axially outwards by two humps of small height, said rim seats each having an axial inner end and an axial outer end,
   wherein the axial inner end of the rim seat of smaller diameter is connected to a bearing surface by a truncated conical portion and,
   wherein the axial inner end of the rim seat of larger diameter is connected to the said bearing surface by a rib of small height, whose axially interior wall has a generatrix forming with the rotation axis an angle β at most equal to 30° open radially and axially outwards,
   wherein said rib, which has an axially inside wall axial width $L_6$ at most equal to the axial width $L_{12}$ of the said second seat, is provided circumferentially with at least two transverse grooves of small size, wherein the support zone is provided with a circumferential groove, closer to the end of the su port zone located on the side of the seat having a smaller diameter than the end of the said zone closer to the rim seat with larger diameter, and wherein the axial width of the bearing support is equal to the width of the support zone and the bearing support is provided on its base with a protuberance that lodges in the circumferential groove of the zone during the mounting operation.

11. The rim according to claim 1 wherein each groove has a circumferential width of substantially 4 mm.

12. A wheel rim comprising:
   two rim seats having different diameters, inclined outwards and extended axially outwards by two humps of small height, said rim seats having an axial inner end and an axial outer end,
   wherein the axial inner end of the rim seat of smaller diameter is connected to a bearing surface by a truncated conical portion and
   wherein the axial inner end of the rim seat of larger diameter is connected to the said bearing surface by a rib of small height, whose axially interior wall has a generatrix forming with the rotation axis an angle β at most equal to 30° open radially and axially outwards,
   wherein said rib, which has an axially inside wall of axial width $L_6$ at most equal to the axial width $L_{12}$ of the said second seat, is provided circumferentially with at least two transverse grooves of small size,
   wherein the bearing surface of the mounting rim is divided into two support zones and axially separated by a circumferential groove located on the side of the seat having the smaller diameter,
   wherein the support zone is provided with another circumferential groove, closer to the end of the support zone located on the side of the seat having a smaller diameter than the end of the said zone closer to the rim eat with larger diameter.

13. A wheel rim comprising:
   two rim seats having different diameters, inclined outwards and extended axially outwards by two humps of small height, said rim seats having an axial inner end and an axial outer end,
   wherein the axial inner end of the rim seat of smaller diameter is connected to a bearing surface by a truncated conical portion and
   wherein the axial inner end of the rim seat of larger diameter is connected to the said bearing surface by a rib of small height, whose axially interior wall has a generatrix forming with the rotation axis an angle β at most equal to 30° open radially and axially outwards,
   wherein said rib, which has an axially inside wall of axial width $L_6$ at most equal to the axial width $L_{12}$ of the said second seat, is provided circumferentially with at least two transverse grooves of small size,
   wherein the outer face of the rim is provided with a circumferential groove of small size arranged axially between the axially interior wall of the rib close to the rim seat of larger diameter, and the rim's bearing surface, the axially outer wall of the rib being connected directly to the rim seat of larger diameter.

14. A wheel rim comprising:
   two rim seats having different diameters, inclined outwards and extended axially outwards by two humps of small height, said rim seats having an axial inner end and an axial outer end,
   wherein the axial inner end of the rim seat of smaller diameter is connected to a bearing surface by a truncated conical portion and
   wherein the axial inner end of the rim seat of larger diameter is connected to the said bearing surface by a rib of small height, whose axially interior wall has a generatrix forming with the rotation axis an angle β at most equal to 30° open radially and axially outwards,
   wherein said rib, which has an axially inside wall of axial width $L_6$ at most equal to the axial width $L_{12}$ of the said second seat, is provided circumferentially with at least two transverse grooves, of small size,
   wherein the bearing surface of the mounting rim is divided into two support zones and axially separated by a circumferential groove located on the side of the seat having the smaller diameter,
   wherein the outer face of the rim is provided with circumferential groove of small size arranged axially between the axially interior wall of the rib close to the rim seat of larger diameter, and the rim's bearing surface, the axially outer wall of the rib being connected directly to the rim seat of larger diameter.

* * * * *